(12) United States Patent
Cahill

(10) Patent No.: US 8,591,134 B2
(45) Date of Patent: Nov. 26, 2013

(54) LIQUID DELIVERY DEVICES

(76) Inventor: Ryan Joseph Cahill, Newtonville, MA (US)

( * ) Notice: Subject to any disclaimer, the term of this patent is extended or adjusted under 35 U.S.C. 154(b) by 474 days.

(21) Appl. No.: 12/581,096

(22) Filed: Oct. 16, 2009

(65) Prior Publication Data

US 2010/0116213 A1    May 13, 2010

Related U.S. Application Data

(60) Provisional application No. 61/106,130, filed on Oct. 16, 2008.

(51) Int. Cl.
*B43M 11/02* (2006.01)
(52) U.S. Cl.
USPC .......................................... 401/219; 401/208

(58) Field of Classification Search
USPC .......................... 401/208, 216, 218, 219, 220
See application file for complete search history.

(56) References Cited

U.S. PATENT DOCUMENTS

| | | | | |
|---|---|---|---|---|
| 3,111,703 A | * | 11/1963 | Kaufman | 401/214 |
| 4,150,904 A | * | 4/1979 | Stewart | 401/186 |
| 4,167,349 A | * | 9/1979 | Testa | 401/144 |
| 4,723,860 A | * | 2/1988 | Giblin et al. | 401/208 |
| 6,718,912 B2 | | 4/2004 | Pappas | |
| 6,758,165 B2 | | 7/2004 | Pappas et al. | |
| 7,117,818 B2 | | 10/2006 | Pappas et al. | |
| 7,153,053 B1 | * | 12/2006 | Wiley | 401/219 |

* cited by examiner

*Primary Examiner* — David Walczak
(74) *Attorney, Agent, or Firm* — Helen S. Liu

(57) ABSTRACT

A liquid delivery device that is adaptive to animals' natural drinking habit and can be easily carried by animal owners. The liquid delivery device includes a moving member positioned at least partially in a chamber and the moving member is capable of moving laterally within the chamber.

18 Claims, 16 Drawing Sheets

LIQUID DELIVERY DEVICES

CROSS-REFERENCE TO RELATED APPLICATION

This application claims, pursuant to 35 U.S.C. §119(e), priority to and the benefit of Provisional Patent Application Ser. No. 61/106,130, filed on Oct. 16, 2008, the disclosure of which is incorporated by reference in its entirety and made part of the present application for all purposes.

BACKGROUND

It is often difficult and cumbersome to feed liquid to pets. Most of animals in their natural habitat drink water by licking. However, animals that are in transit, such as in a walk or engaged in a recreational activity, often do not have access to water that are suitable for their drinking habit. For example, when a pet animal is in need of water, a pet owner would attempt to pour water from a bottle directly into the pet's mouth. This usually results inefficient feeding and excess spillage. Alternatively, a pet owner would pour water from a bottle into a bowl or dish from which a pet would drink. The pet owner, in this situation, must carry a bowl or a dish separate from the water bottle. Various attempts to conveniently provide hydration to pets have been made.

In one example, a water bottle for pets includes a bottle-dish assembly. When a pet is in need of water, the dish is removed from the assembly, water is poured into the dish, and the pet drinks water from the dish. Although this assembly solves the problems of separately carrying water bottle and water dish, it is nonetheless cumbersome to carry and use this device. In addition, any water that is left in the dish will have to be discarded before the bottle-dish assembly is put together.

Another example is a water bottle that includes a ball-valve assembly. This water bottle is positioned upside down, i.e., the ball-valve assembly points downwardly. When the water bottle is not in use, the ball in the ball-valve assembly falls and seals the valve to prevent water from existing; and when a pet needs water, it pushes the ball in the ball-valve assembly upwardly which releases water from the water bottle. The ball-valve assembly is typically constructed as a metal tube and a ball that is located in the metal tube. This device, however, is not adaptive to pets' natural drinking habit.

Accordingly, there is a desire in the art to provide a liquid delivery device that can be adaptive to an animal's natural drinking habit, can be conveniently carried by an animal owner, and/or can efficiently provide liquid to an animal.

SUMMARY OF THE INVENTION

In light of foregoing, the present teachings provide liquid delivery devices that can address various deficiencies and shortcoming of prior art, including those outlined above.

In one aspect, the present teachings provide liquid delivery devices that can be adaptive to animals' natural drinking habit, can be used for efficiently feed liquid to animals, and can be easily carried by animal owners. The present teachings also provide devices and equipments that include the liquid delivery devices as described herein. The present teachings further provide methods of preparing and using the liquid delivery devices, and devices and equipments that include the liquid delivery devices.

The foregoing as well as other features and advantages of the present teachings will be more fully understood from the following figures, description, and claims.

BRIEF DESCRIPTION OF THE DRAWINGS

It should be understood that the drawings described below are for illustration purpose only and are not necessarily to scale. The drawings are not intended to limit the scope of the present teachings in any way.

DETAILED DESCRIPTION

Figure 1A:
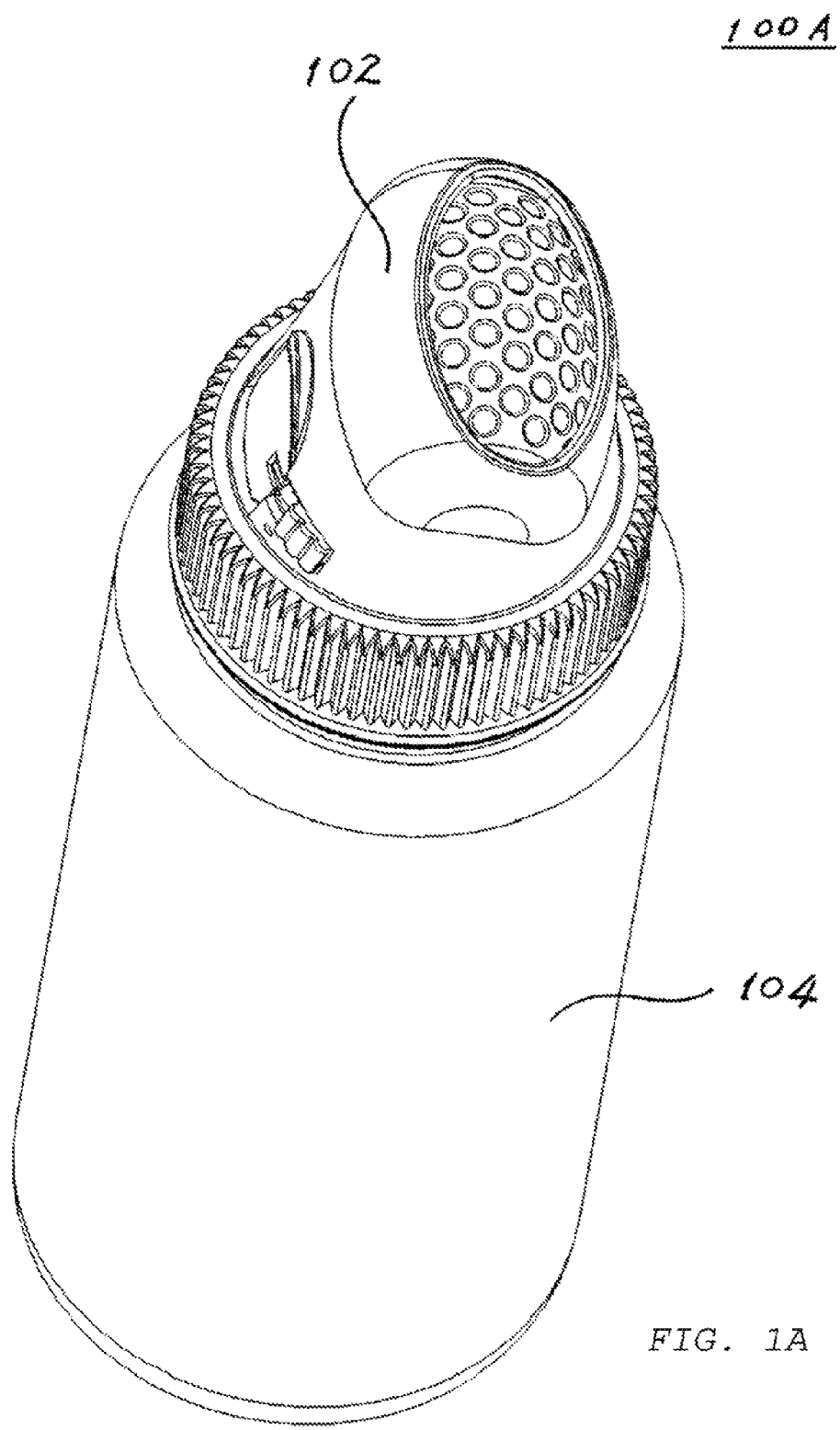
FIGS. 1A and 1B show perspective views of some exemplary embodiments of the present teachings.

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously. The term "fluid" used herein includes any liquids, colloidal systems, suspensions and the like. For example, fluid can be water or any mixture that includes water.

It should also be understood that devices of the present teachings, including any parts thereof, can be prepared, made, and manufactured from any materials that are suitable for containing and delivering fluids. For example, these materials can be metal (e.g., aluminum, steel, titanium, gold, silver, and alloys thereof), plastics (e.g., polypropylene, polyethylene, polystyrene, polycarbonate, polyester, polyamide, and any copolymer and/blend thereof), glass, and any composite thereof. In some embodiments, the device as described herein can be prepared, made, and manufactured from any materials that are non-toxic (e.g., in compliance with regulations that govern containers for food, drug, and cosmetics). In some embodiments, these materials can degrade in natural environments. For example, these materials can include polyhydroxyalkanoates, including but not limited to polyhydroxybutyrates, polylactates, polyhydroxyvalerates, polyhydroxyhexanoates, polyhydroxyoctanoates, copolymers thereof, and mixtures thereof.

It should also be understood that the devices of the present teachings, including any parts thereof, can be prepared, made, and manufactured by any processes that are known by persons skilled in the arts. The processes can include, for example, injection molding, extrusion, blow molding, stretching molding, thermoforming, compression molding, calendaring, transfer molding, laminating, fiberglass molding, pultrusion, filament winding, vacuum forming, casting, and the like. In addition, a device or any parts thereof can be alternatively made by any processes exemplified above and it will be a routine practice for a person skilled in the art to choose any processes according to a design or a design purpose. Further, the device of the present teachings, including any parts thereof, can be jointed, contacted, or connected, either removably or irreversibly, by a connecting method known in the arts. The connecting methods can include, for example, welding (e.g., ultrasonic welding, heat welding, adhesive welding, and other heat and chemical welding), fastening (e.g., battens, nut-and-bolt connections, threaded connections, buckles, buttons, clamps, clasps, clips, frogs, grommets, nails, pegs, pins, rivets, rubber bands, screws, snaps, stitches, straps, staples, tacks, ties, wedges, zippers, and the like), crimping, soldering, taping, gluing, cementing, and the like. It will be a routine practice for a person skilled in the art to choose any connecting method according to a design or a design purpose.

It should further be understood that detailed description and drawings herein are in no way to limit the scope of the invention. Any parts, devices, or steps that are equivalent, necessary, or ancillary to any embodiments, as a part or in whole, of the present teachings are included herewith. Particularly, any sealing members, washers, guiding devices (e.g., guiding pins, guiding indentations, and the like), and the likes are included herewith.

One aspect of the present teachings provides fluid delivery devices. For example, the fluid delivery devices can be adaptive to animal's natural drinking habit and can be used for efficiently feeding water to animals. In some embodiments, the fluid delivery devices can be liquid control cap.

In various embodiments, the devices each include a casing having a first end, where the first end includes a wall defining a chamber. In some embodiments, the first end of the casing can be in one piece. In some embodiments, the first end of the casing can include two pieces. For example, the first end of the casing can include a base part (e.g., a middle portion) and a top part (e.g., a front portion) connected therewith. This configuration can provide a fluid control device of the present teachings the ease of dissembling and reassembling the device for cleaning, sanitary maintenance, and the like. In certain embodiments, the base part and the top part can be joined structurally, mechanically, or chemically. For example, one of the base part and the top part can have a male joining member and the other of the base part and the top part can have a female joining member, where the male joining member and the female joining member can be used for connecting the base part and the top part, for example, by pressing the two joining members or by rotating one of the two joining members against the other of the two joining members. In particular embodiments, the base part and the top part can be joined by a key and locking connection. For example, a mechanism can be used for connecting the top part and the base part. In certain embodiments, the mechanism can include a screw, a bolt, and the like. For example, the top part and the base part can be connected by a fastening agent, including an adhesive and the like. In certain embodiments, the adhesive can include drying adhesive, contact adhesive, hot adhesive, reaction adhesive, UV and light curing adhesives, pressure sensitive adhesive, and the like. In some embodiments, the first end of the casing can include an intermediate part positioned between the base part and the top part. In certain embodiments, the intermediate part can be joined with the base part structurally, mechanically, or chemically as described herein. In certain embodiments, the intermediate part can be jointed with the top part structurally, mechanically, or chemically as described herein. In specific embodiments, the first end of the casing can include a top part and a base part joined by a plurality of screws or bolts.

In various embodiments, the chamber defined by the wall can include an opening. For example, the opening can be located at the end of the first end. In the embodiments where the first end can include two or more pieces, the opening can be located in the top part or the front portion. The opening can be in any shape. In some embodiments, the opening can be rectangular (e.g., square). In some embodiments, the opening can be circle. In some embodiments, the opening can be elliptical. The opening can have various sizes. In some embodiments, openings with different sizes can be interchangeable, for example, to accommodate various sizes of animals' tongues.

In various embodiments, the device can include a moving member positioned at least partially within the chamber. For example, the moving member can be a rolling member (e.g., a liquid delivery roller). In some embodiments, the moving member can substantially be spherical. In some embodiments, the moving member can substantially be cylindrical. In some embodiments, the moving member can substantially be spheroidal, including oval. In certain embodiments, an oval shaped rolling member can improve fluid transfer by increasing surface area without diameter increase along the short axis.

Further, in some embodiments, a part of the moving member can extend through the opening of the chamber. For example, the portion of the moving member that is extended through the opening can have an external surface that is less than, equal to, or more than half of the total surface of the moving member. In certain embodiment, the surface that is exposed through the opening can be less than half of the total surface of the moving member. In some embodiments, the rolling member can be in a position such that it can move with optional assistance of an external force. For example, the external force can be exerted by any movement relative to the device and the movement can be lateral (i.e., pushing the moving member into the chamber) and/or rolling. In certain embodiments, when an animal licks devices of the present teachings, the moving member can roll within the chamber as described herein, thereby transferring liquid to the animal. For example, because the moving member can freely roll within the chamber, a lower force is needed to rotate the moving member. As a result, an animal can drink liquid through a liquid control device of the present teachings through its natural licking habit. The requirement of training the animal to exert lateral force in order to drink the liquid can be substantially reduced, if not eliminated.

In various embodiments, the device can include a second end. For example, the second end (e.g., a back portion) can be connected with the first end by a casing body. In some embodiments, each of the casing body and the second body can include a wall defining a channel. In certain embodiments, each of the channels as described herein can connect with each other and to the chamber as described herein to form a fluid communication channel. In particular embodiments, the casing can include a hallow body extending from the second end, through the casing body and the first end, to the opening as described herein. In some embodiments, the second end can include a connection member.

In various embodiments, the device can include a fluid source. In some embodiments, the connection member of the second end can be used for connecting to a fluid source. For example, the fluid source can be a container or a fluid delivery device. In some embodiments, the fluid source can be a bottle, including a water bottle. In some embodiments, the fluid source can be a fluid delivery device, including a fluid outlet. In certain embodiments, the fluid outlet can be a water outlet, including a faucet. In some embodiments, the fluid delivery device can include equipment that can be used for feeding fluid to animals. In certain embodiments, the device can be a water station for animals.

In various embodiments, the device can include a liquid control mechanism, including a stop member (e.g., a liquid control valve). In these embodiments where the device comprises a liquid control mechanism, the amount of liquid transferred depends on the control mechanism, not the movement of the moving member. In some embodiments, the stop member can have a stop position. For example, at the stop position, the stop member can at least partially block the fluid communication channel as described herein. In certain embodiments, the stop member at the stop position can completely block the fluid communication channel. As a result, in certain embodiments, the fluid delivered through devices of the present teachings can at least partially be stopped and, therefore, can be controlled, for example, by changing the size of the fluid communication channel. This in turn can be achieved by adjusting the position of a control end (e.g., a push button). In some embodiments, the stop member can have a flow position. For example, at the flow position, the stop member can be removed from the stop position, i.e., blocking position, to allow fluid flow through the fluid communication channel. In some embodiments, the stop member can include a control end (e.g., a push button) and a stop end (e.g., a liquid control valve). In certain embodiments, the stop end can reside within the chamber as described herein. In certain embodiments, the stop end can reside adjacent to the moving member as described herein. In certain embodiments, the stop end can reside adjacent to the opening as described herein. In some embodiments, the control end and the stop end can be connected with a stop body (e.g., a linking shaft). In some embodiments, the control end can interact with the stop end through means other than the stop body. For example, the means can be a magnetic force.

In various embodiments, the device can include a locking member, including a control latch or a secure lock. For example, the locking member can reside adjacent to the stop member. In some embodiments, the locking member can reside adjacent to the control end as described herein. In some embodiments, the locking member can reside adjacent to the stop end as described herein. In some embodiments, the locking member can reside adjacent to the stop body as described herein. In some embodiments, the locking member can be means that can control the interaction between the control end and the stop end. For example, the locking member can be a control device that can activate and deactivate the interaction between the control end and the stop end. In certain embodiments, the locking member can be a switch. The locking member can typically be used for controlling the stop member. Specifically, in some embodiments, the locking member can have a locking position, where the stop member can be locked at a partial stop position or at a partial flow position, therefore providing the device with additional control of the liquid flow. In certain embodiments, at the locking position, the locking member can lock the stop member at the stop position to prevent fluid from spilling from the device.

Another aspect of the present teachings provides methods of preparing devices of the present teachings. In various embodiments, the methods can include providing the casings and providing one or more of the moving members where the casings and the moving members are as described herein. In various embodiments, the methods can include positioning the one or more moving members in the casing to form devices of the present teachings. In some embodiments, the providing casings step can include providing top parts and bottom parts. In some embodiments, the method can include positioning one or more moving members within the chamber formed by each of the top parts and the bottom part. In certain embodiments, the method can further include securing the top parts and the bottom parts so that the moving members are at least partially encased in the chamber. Each of the casings, the top parts, the bottom parts, the chamber, the moving members and the fastening means are as defined herein.

Another aspect of the present teachings provides methods of using devices of the present teachings. In various embodiments, the methods can include providing the devices and connecting the devices with a fluid sources. In some embodiments, the methods can include allowing an animal to lick the device. It should be noted that the invention as disclosed herewith can provide a liquid controlling device that is not only portable, requires no extra parts, and can be used to efficiently feed pets, but also is friendly to pet, including suitable for pets' natural drinking habits.

The features, benefits, and functionalities of the present teachings will become more readily apparent to those skilled in the art from the following detailed description of the accompanying figures. Although the following embodiments as shown in FIGS. 1-10 sometimes are referred to as pet drinking devices, it should be understood that such devices/structures can be used in a variety of applications, e.g., in systems wherein a fluid is applied to a surface or a substrate. Further, the embodiments described herein are only for illustration purpose and in no way limit the scope of the present teachings.

Figure 1B:
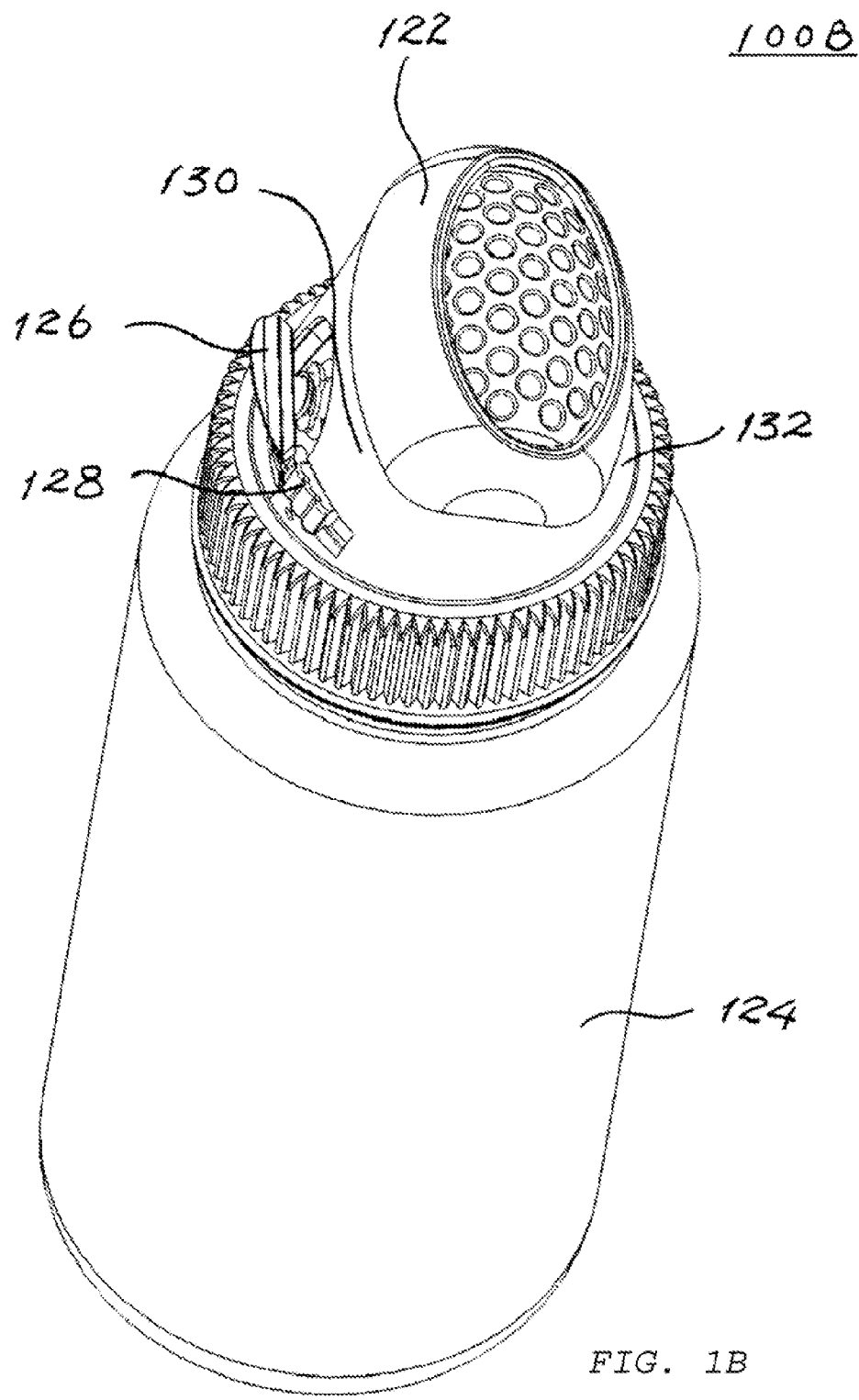

FIGS. 1A and 1B illustrates an embodiment of the present teachings where a liquid delivery device, such as a liquid control cap, is connected with a liquid container. More specifically, FIG. 1A shows the liquid control cap (102) in its open state, where liquid, such as water, can flow from the liquid container (104) through and out of the liquid control cap (102). FIG. 1B shows a liquid control cap (122) in its closed state, where liquid, such as water, can be sealed inside a liquid container (124) by the liquid control cap (122). In some embodiments, the connection between the liquid control cap (122) and the liquid container (124) can be a non-detachable connection, i.e. the liquid control cap (122) cannot be removed from the liquid container (124). This type of connection can encourage one-time and/or disposable use of the assembly (100A (open state) and 100B (close state)). For example, this type connection can include tape, weld, glue, single-piece body, non-reversible screw, and the like. In some embodiments, the connection between the liquid control cap (122) and the liquid container (124) can be a detachable connection, i.e. the liquid control cap (122) can be removed from and re-attached to the liquid container (124). In some embodiments, the liquid container can be a permanent one. In certain embodiments, the liquid container can be ergonomically designed. In some embodiments, the liquid container can be a disposable one.

In some embodiments, a liquid control cap can include a push button (126), a secure lock (128), an upper curved surface (130) and a lower curved surface (132). This type of connection can allow liquid refill. Examples of this connection include thread, snap, press clamp, and the like. For example, FIG. 5 illustrates a threaded connection.

Figure 2:
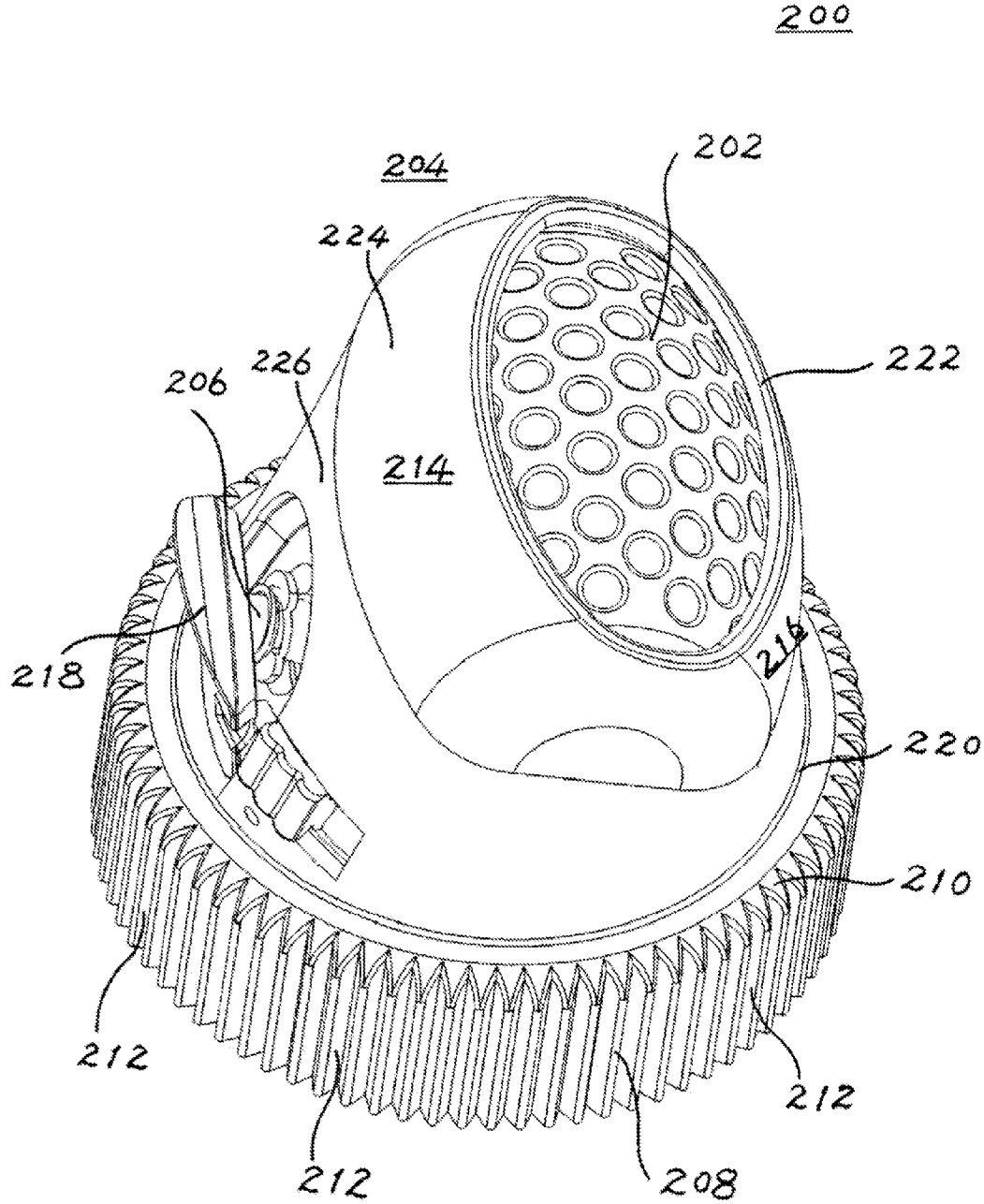
FIG. 2 is a perspective view of an exemplary embodiment of the present teachings.
Figure 3A:
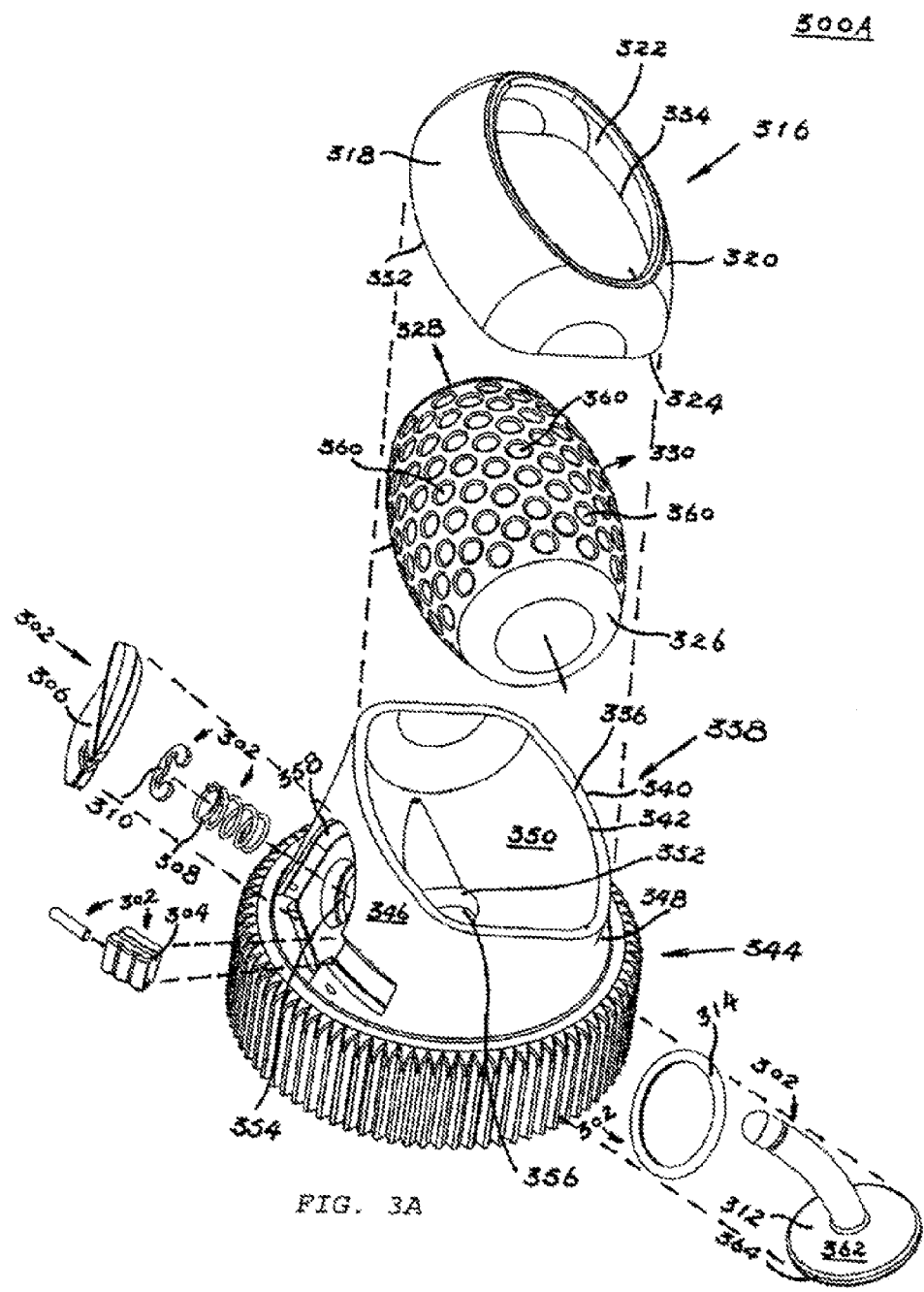
FIGS. 3A and 3B are exploded views of certain exemplary embodiments of the present teachings.
Figure 3B:
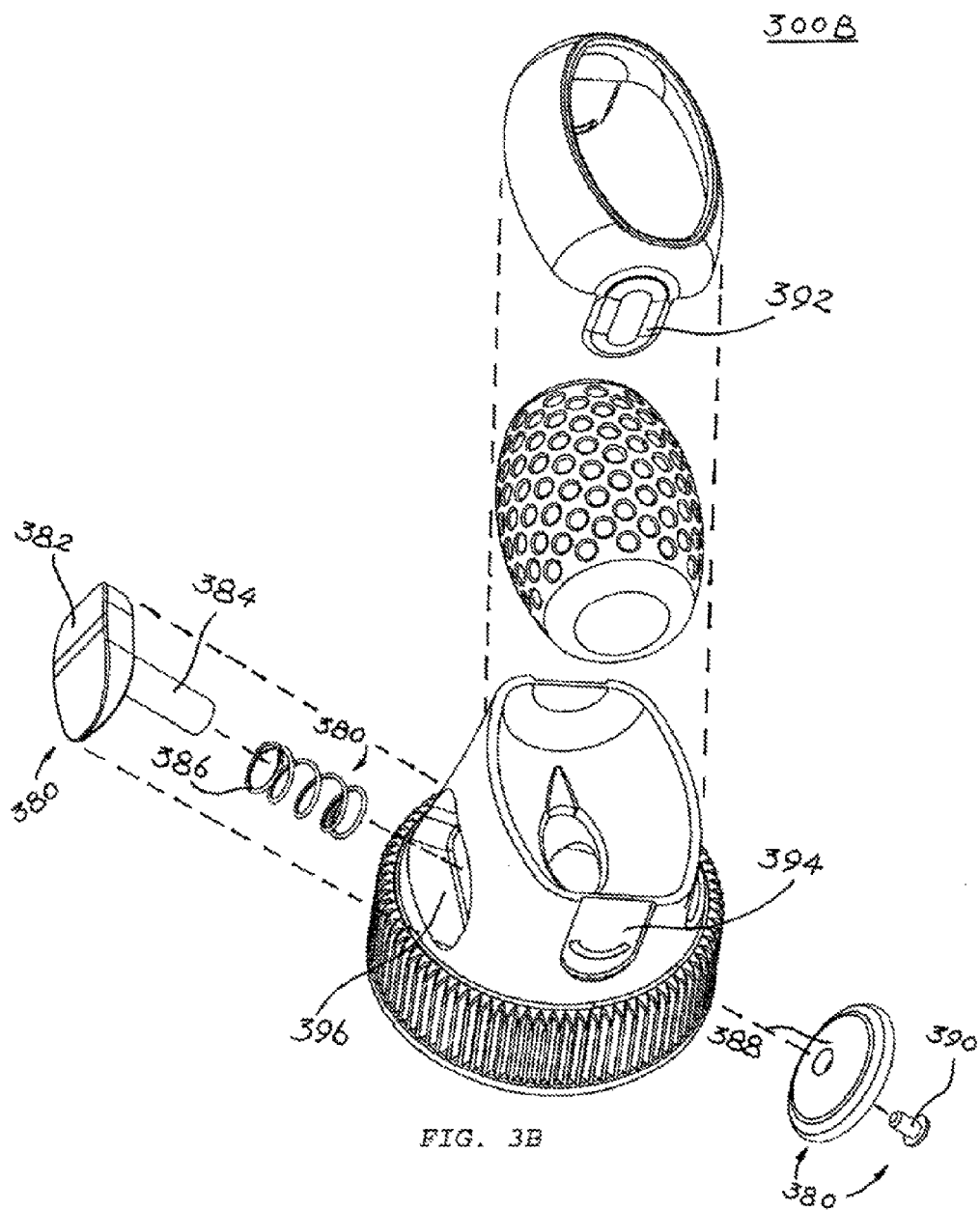
Figure 4:
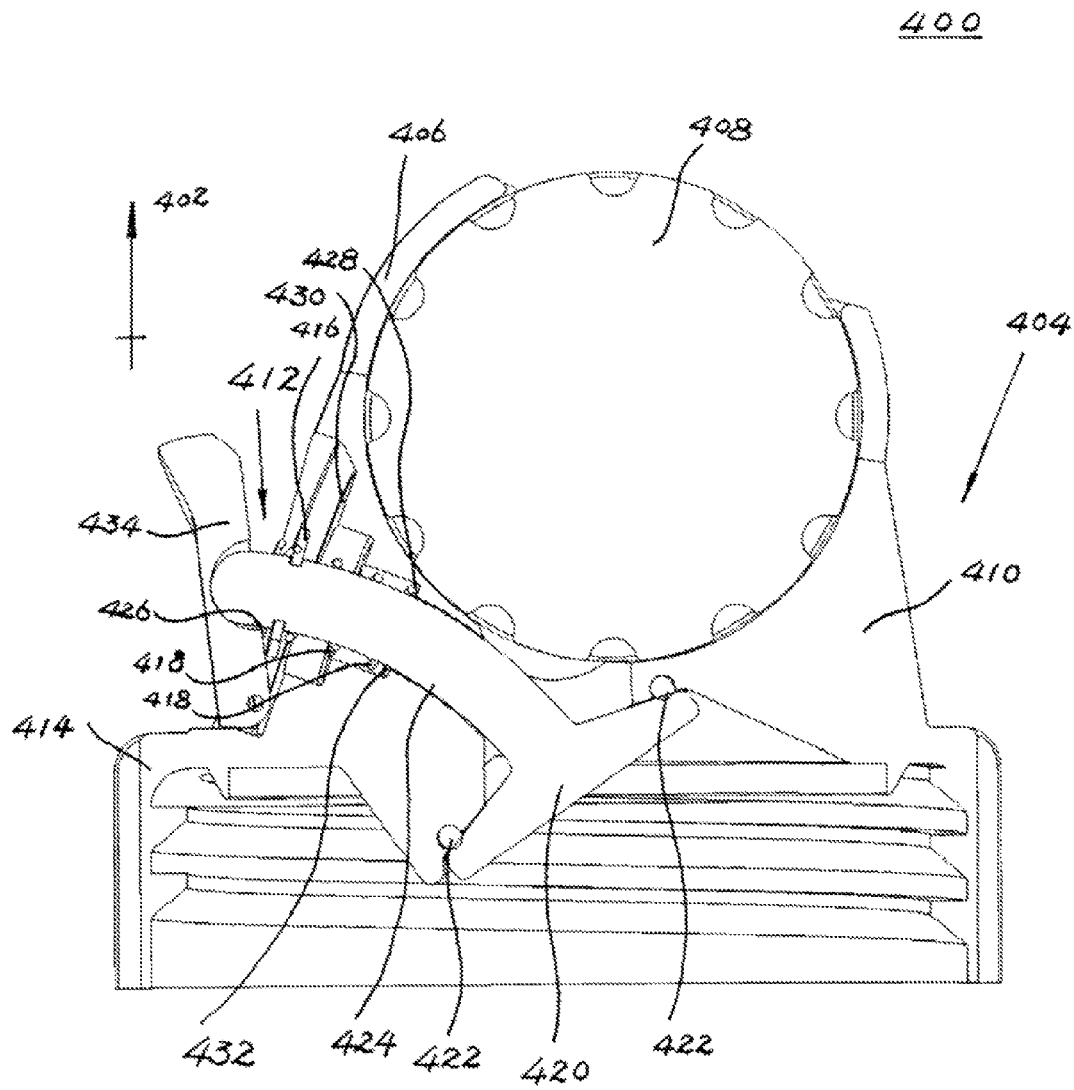
FIG. 4 is a side cut-away view of an exemplary embodiment of the present teachings.

FIGS. 2-4 illustrate exemplary embodiments of the present teachings. More specifically, FIG. 2 is a prospective view of a liquid control cap (200). As shown in FIG. 2, the liquid control cap can include a liquid delivery roller (202), a cap body (204) at least partially housing the liquid delivery roller (202), and a liquid control mechanism (206) incorporated within the cap body (204). FIG. 3A is an expanded view of a liquid control cap (300A). As illustrated in FIG. 3A, a liquid control mechanism (302) can include a secure lock (304), a push button (306), a spring (308), a spring-compressing clip (310) for compressing the spring (308), and a liquid control valve (312) with a liquid sealing ring (314). FIG. 4 is a cross-sectional view of a liquid control cap (400) along its general longitudinal axis (402). As illustrated in FIG. 4, the liquid control cap body (404) can include a front portion (406) holding a liquid delivery roller (408) inside the cap body (404); a middle portion (410) for incorporating a liquid control mechanism (412); and a back portion (414) for attaching the cap body to a liquid container.

Figure 5:
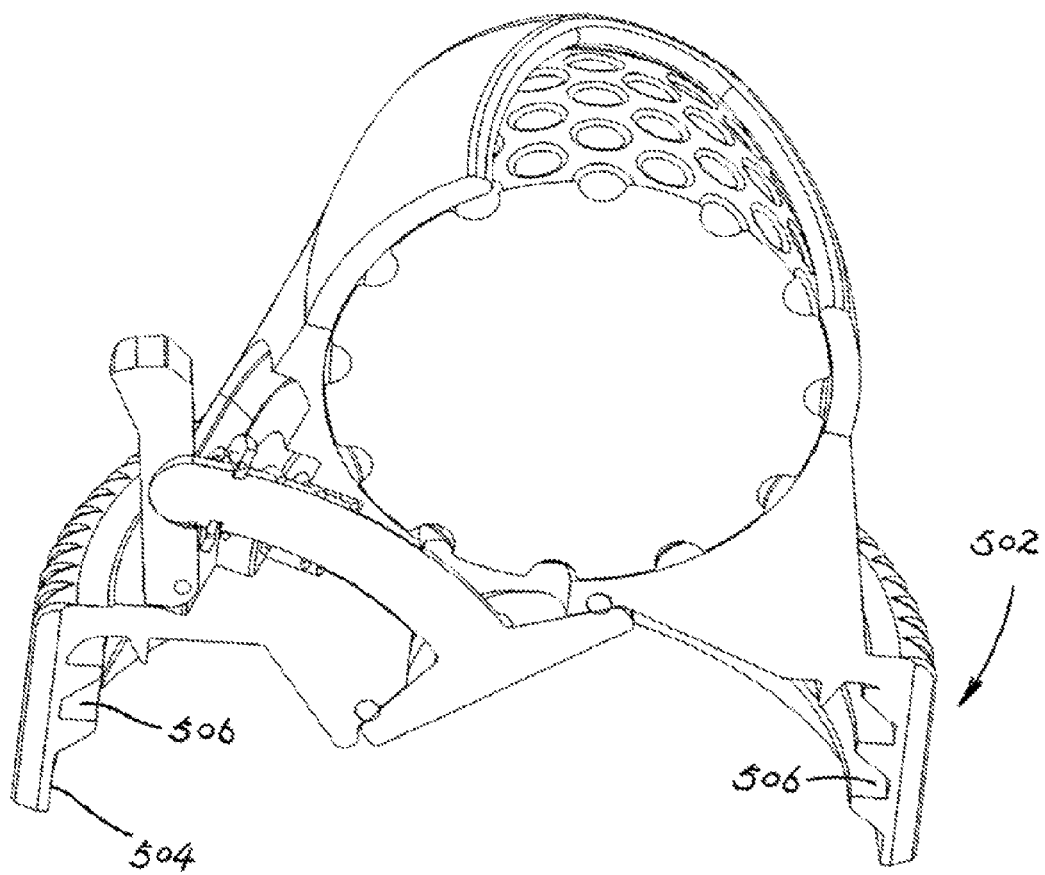
FIG. 5 is a top partially cut-away view of an exemplary embodiment of the present teachings.

FIG. 5 is a prospective cross-sectional view of a liquid control cap (500). As shown in FIG. 5, the back portion (502) of the liquid control cap can include an inner surface (504) where the inner surface (504) can contact an outer surface of an opening of a liquid container (not shown) thereby creating a liquid seal preventing liquid inside of the liquid container (not shown) from leaking out. In some embodiments, the cap body (500) can include an additional seal (not shown) removably connecting with a liquid container (not shown) to create a seal. As illustrated in FIG. 4, the back portion (414) of the cap body (404) can have a general cylindrical profile configured to match the corresponding opening of a liquid container (not shown). In some embodiments, the back portion (414) of the cap body (404) can adopt other shapes and/or profiles as long as it meets its intended function of attaching to a liquid container (not shown). In some embodiments, the inner dimension of the back portion (414) of the cap body (404) can vary as the outer dimension of the opening of liquid containers changes. For example, the inner dimension of the back portion can vary from about 0.25 inch to about 25 inches. In certain embodiments, the inner dimension of the back portion (414) of the cap body (404) can range from about 1 inch to about 5 inches.

As described in FIG. 5, the connection between the liquid control cap (500) and a liquid container can be detachable or non-detachable. FIG. 5 illustrates a preferred embodiment of the present teachings where the back portion (502) of the cap body (500) can be threadably connected to the corresponding opening of a liquid container. In such case, the inner cylindrical surface (504) of the back portion (502) can have female threads (506), which can incorporate with male threads on the corresponding outer cylindrical surface of an opening of a liquid container. In some embodiments, the female threads (506) on the inner cylindrical surface (504) of the back portion (502) of the cap body (500) can vary as the male threads on the outer cylindrical surface of an opening of a liquid container changes. In certain embodiments, the female thread can be a single-lead thread, double-lead threads, or multiple-lead threads. In certain embodiments, the female thread can be a partial thread. In certain embodiments, the female thread can include a thread having from one to twenty, one to fifteen, one to ten, one to five, or one to three revolutions. In certain embodiments, the female thread can have a pitch ranging from about 0.05 inch to about 2 inches, about 0.05 inch to about 1.5 inches, about 0.05 inch to about 1 inch, about 0.05 inch to about 0.8 inch, about 0.05 inch to about 0.5 inch, about 0.05 inch to about 0.3 inch, or about 0.05 inch to about 0.2 inch. In certain embodiments, the female thread can have a standard pitch. In particular embodiments, the female threads (506) on the inner cylindrical surface (504) of the back portion (502) of the cap body (500) can have a pitch ranging from about 0.1 inch to about 0.5 inch, or about 0.1 inch to about 0.3 inch. In certain embodiments, the female threads (506) can be a buttress thread. In particular embodiments, the female thread can be a single-lead buttress-type right-handed helical thread with at least one revolution and a pitch of about 0.2 inch. A threaded connection between the liquid control cap (500) and a liquid container can be a preferred design, due to such connection can allow a person refill a liquid container once it is emptied or fill a liquid container with his/her own desired liquid such as a fluid medicine. As stated above, in some occasions, where no refill is need or one time use of is preferred, a fixed connection between the back portion (502) of the cap body (500) and an opening of a liquid container can be incorporated. Although the embodiment as shown in FIG. 5 includes the back portion of the liquid control cap having a female thread and the liquid container having a male thread, it should be understood any other configuration can be used to achieve the same effect, including the back portion of the liquid control cap having a male thread and the liquid container having a female thread.

Referring back to FIG. 2, the outer cylindrical surface of the back portion (210) of the cap body (204) can optionally include a texture. Such texture can allow easy handling of the cap body (204) while opening or closing the liquid control mechanism (206) and/or while attaching or detaching the liquid control cap (200) from a liquid container. FIG. 2 illustrates an exemplary embodiment of such textured surface (208) where multiple grooves (212) can be incorporated on the outer cylindrical surface (208) of the back portion (210) of the cap body (204). Other designs of texture can also be incorporated to meet the same intended function.

Referring again to FIG. 3A, the cap body can include a front portion (316), where the front portion (316) can have a hollow feature. As illustrated in FIG. 3A, the front portion (316) of the cap body can include a first curved shell (318), a second curved shell (320), a front opening (322) between the first and second curved shells at the front end (316), and a back opening (324) between the first and second curved shells at the back end of the front portion (316) of the cap body. It should be understood that the first curved shell (318) and second curved shell (320) are designated for illustration purpose only. It various embodiments, the entire front portion (316) of the cap body can be made by any manufacturing processes described herein, including injection molding, compression molding, extrusion molding, thermoforming, and the like. In some embodiments, the first curved shell (318) and second curved shell (320) can be made separately through the manufacturing processes as described herein, and the two shells can be assembled together to form the entire front portion (316) of the cap body. For example, the assembling methods can include, but not limited to, ultrasonic welding, heat welding, adhesive welding, and other heat, chemical, mechanical assembling means known in the industry.

Figure 6:
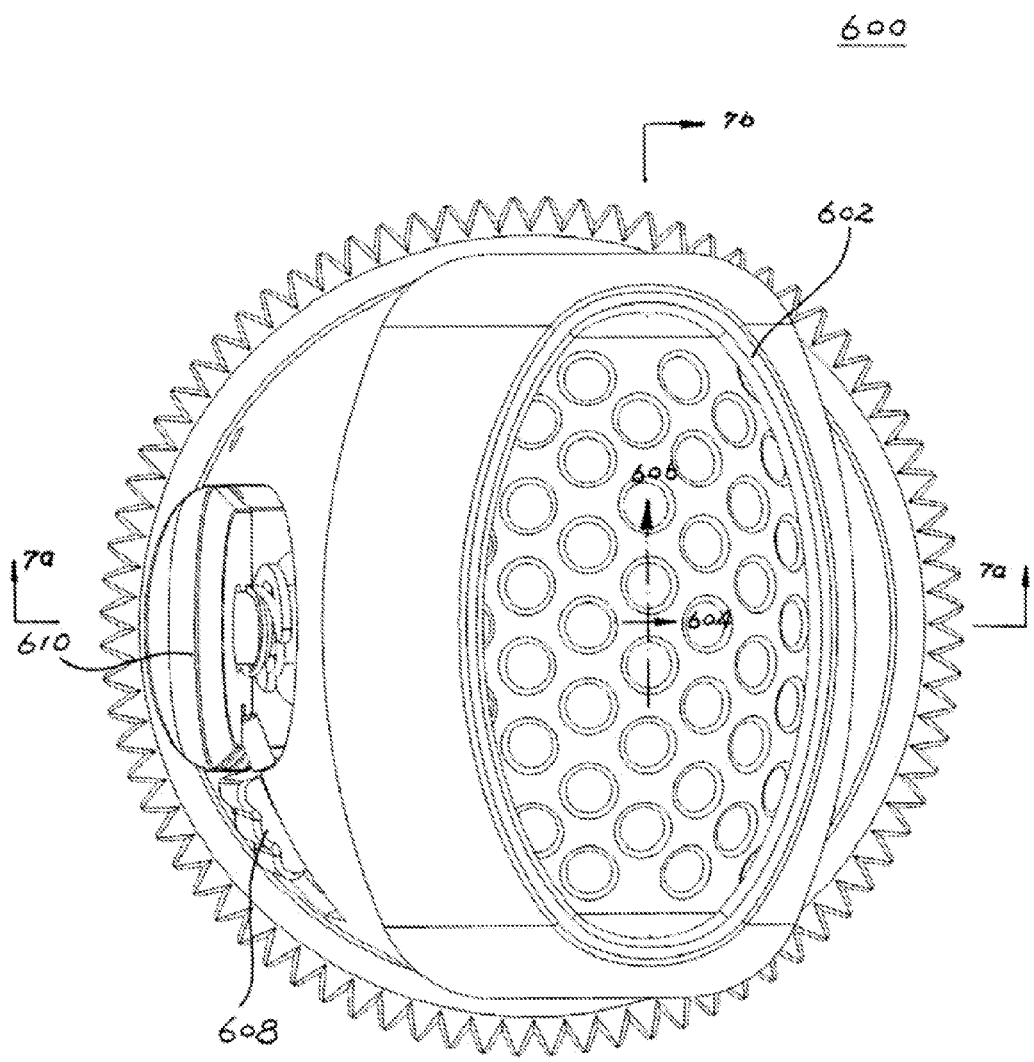
FIG. 6 is a top view of an exemplary embodiment of the present teachings.
Figure 7A:
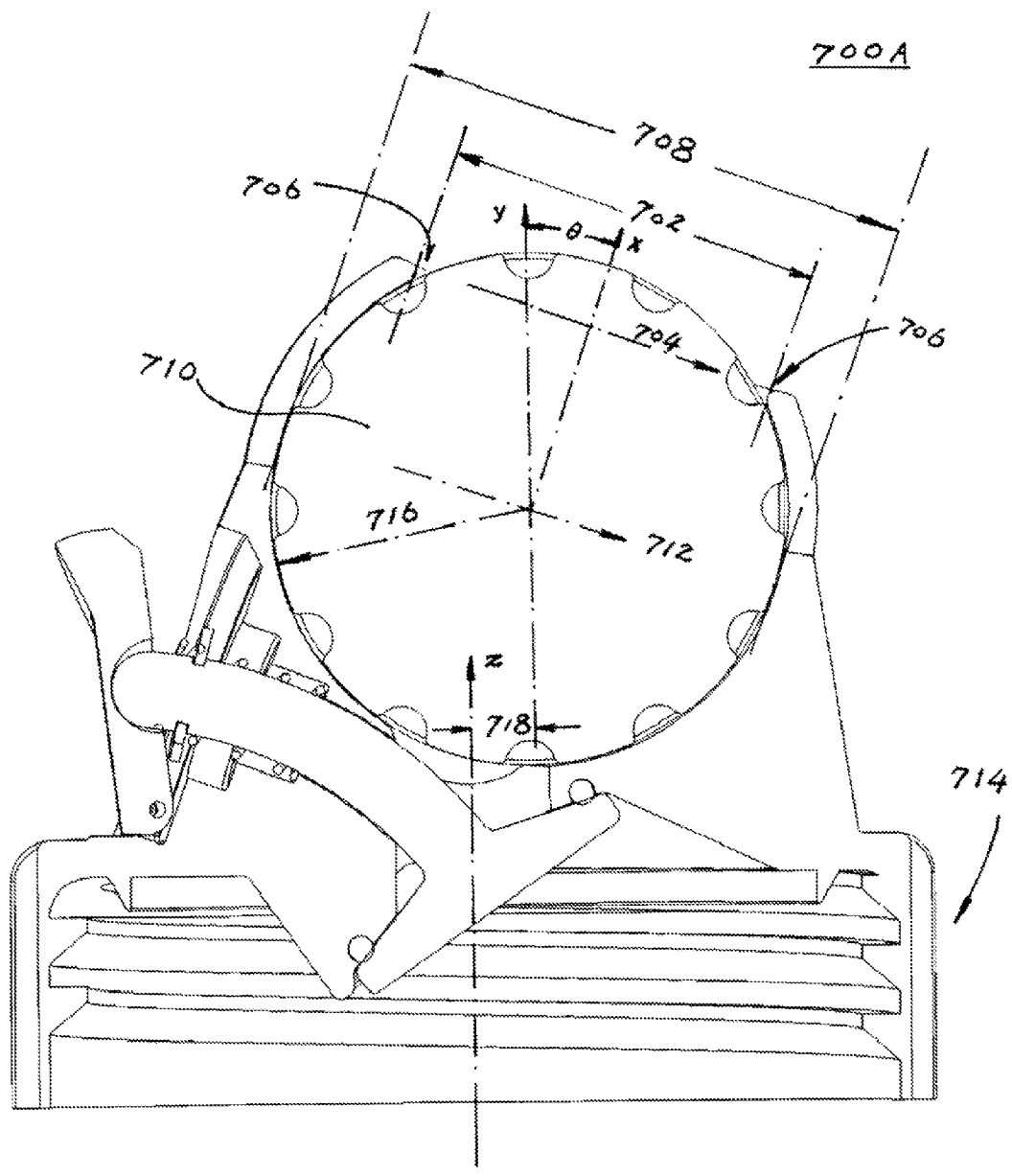
FIGS. 7A and 7B are side views, cut-away along cut lines 7a-7a and 7b-7b in FIG. 6, respectively, of an exemplary embodiment of the present teachings.
Figure 7B:
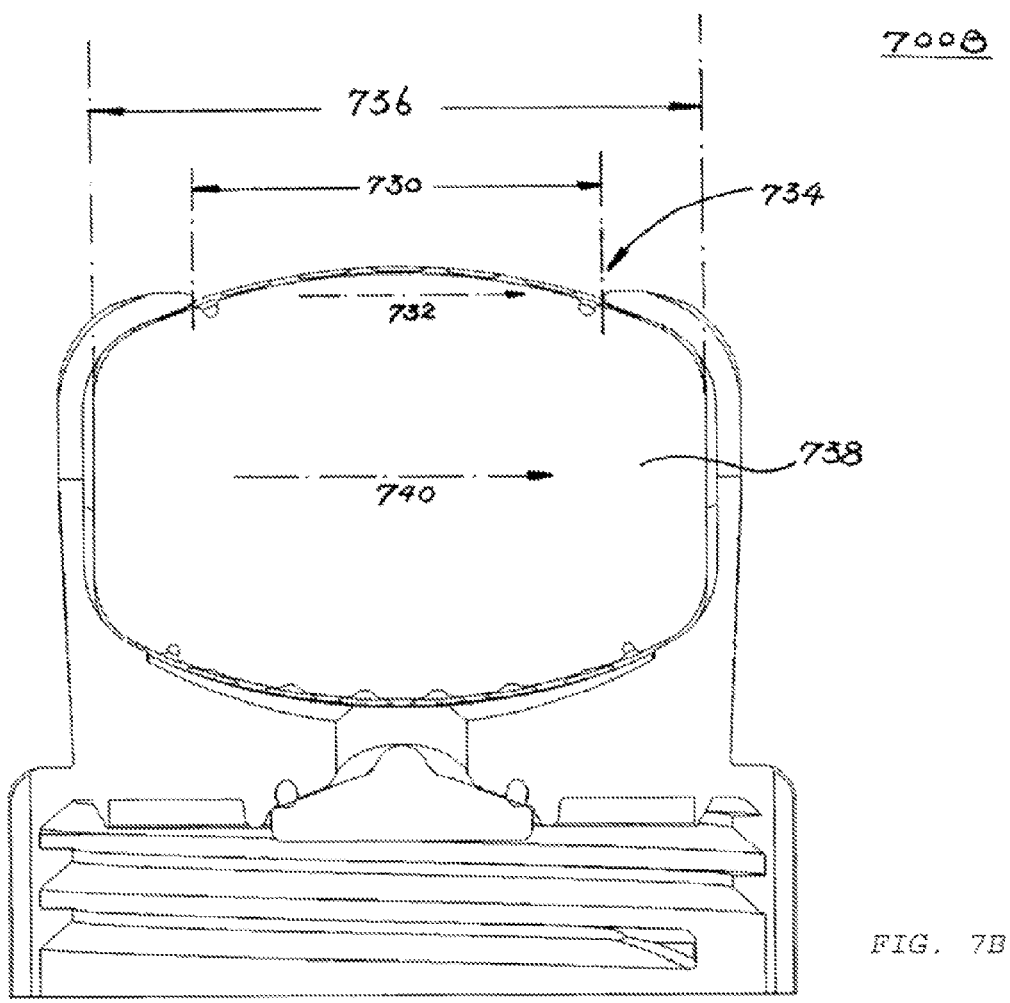

Referring again to FIG. 3A, in some embodiments, the first curved shell (318) can have more surface area than the second curved shell (320) of the front portion (316) of the cap body. In some embodiment, the first curved shell (318) can have same surface area as the second curved shell (320). In some embodiments, the front opening (322) of the front portion (316) of the cap body can expose part of the liquid delivery roller (326). FIG. 6 is a front end view of an exemplary embodiment of the liquid control cap (600). As illustrated in FIG. 6, the liquid control cap (600) can include a front opening (602), where the front opening (602) can be in a general elliptical shape with a minor (short) axis (604) and a major (long) axis (606). As illustrated in FIG. 3A, the liquid delivery roller (326) can have an ellipsoidal shape with a first long axis of symmetry (328) and a second short axis (330). Alternatively, the liquid delivery roller (326) can have other shapes, including spherical, cylindrical, and the like. In some embodiments, the size of the front opening (322) of the front portion (316) of the cap body can be designed such that the liquid delivery roller (326) can be held securely within the cap body while exposed as much as needed for spinning by an external force. For example, the external force includes being licked by an animal. In certain embodiments, the liquid delivery roller (326) can roll freely within the cap body without additional constraint, for example, from a spring or the like. In certain embodiments, as illustrated in FIG. 7A, a liquid control cap (700A) can include a projected width (702), along the minor (short) axis (704) of the front opening (706), where the projected width (702) can range from 1% to 99% (e.g., from 25% to 75%) of the diameter (708) of the liquid delivery roller (710) on an imaginary plane along the second short axis (712). Similarly, as illustrated in FIG. 7B, a liquid control cap (700B) can include a projected length (730) along the major (long) axis (732) of the front opening (734), where the projected length (730) can range from 1% to 99% (e.g., from 70% to 90%) of the length (736) of the liquid delivery roller (738) along its first axis of symmetry (740). Referring again to FIG. 7A, axis x refers to an axis extending from the center of the liquid delivery roller (710), where the first axis of symmetry (not shown) intersecting with the second short axis (712) of the liquid delivery roller (710), to the center of the front opening (706), where the minor (second) axis (704) intersecting the major (long) axis (not shown) of the front opening (706). Similarly, axis y refers to an axis extending vertically from the center of the liquid delivery roller (710), where the first axis of symmetry (not shown) intersecting with the second short axis (712) of the liquid delivery roller (710), as such, axis y is parallel to the longitudinal axis z of a cylindrical body of the back portion (714) of the cap body. In one embodiment of the present teachings, as illustrated in FIG. 7A, angle θ between axis x and axis y can range from 0° to 90° (e.g., from 5° to 85°, from 5° to 75°, from 5° to 65°, from 5° to 55°, from 5° to 45°, from 5° to 35°, from 5° to 25°, from 5° to 15°, from 10° to 90°, from 10° to 85°, from 10° to 65°, from 10° to 55°, from 10° to 45°, from 10° to 35°, from 10° to 25°, from 10° to 15°, from 15° to 85°, from 15° to 75°, from 15° to 65°, from 15° to 55°, from 15° to 45°, from 15° to 35°, from 15° to 25°, from 25° to 85°, from 25° to 75°, from 25° to 65°, from 25° to 55°, from 25° to 45°, from 25° to 35°, from 35° to 85°, from 35° to 75°, from 35° to 65°, from 35° to 55°, from 35° to 45°, from 45° to 85°, from 45° to 75°, from 45° to 65°, from 45° to 55°, from 55° to 85°, from 55° to 75°, from 55° to 65°, from 65° to 85°, from 65° to 75°, or from 75° to 85°, for example, to release strain on the person holding the liquid controlling device. In some embodiments, also as illustrated in FIG. 7A, the axis y can be aligned with longitudinal axis z. In another embodiment of the present teachings, the distance between the axis y and longitudinal axis z (718) can range from 0 to 90% of radius (716), including from 0% to 50% of radius (716).

Referring again to FIG. 3A, the front portion (316) of the cap body can include a back opening (324) surrounded by a back surface (not shown) with an outer back surface edge (332) and an inner back surface edge (334). This back surface can align and attach to a front surface (336) of a middle portion (338) of the cap body. Such attachment can be achieved by any connecting methods described herein, including ultrasonic welding, heat welding, adhesive welding, solvent welding, and other heat, chemical, mechanical means known in the art. Upon assembly, the outer back surface edge (332) and an inner back surface edge of the front portion (334) can also align with an outer front surface edge (340) and an inner front surface edge (342) of the middle portion (338) of the cap body. In the present teachings, as later described, the purpose of this design can be for ease of assembly of liquid delivery roller (326) inside the cap body such that the liquid delivery roller (326) can be housed inside the cap body by the front and middle portions (316 and 388) of the cap body. In some embodiments, the assembly of the front and middle portions (316 and 338) can be water-tight between the back surface of the front portion (316) and the front surface (336) of the middle portion (338) of the cap body.

In an alternative embodiment, the front portion of the cap body can removably attach to the middle portion of the cap body. Such attachment allows easy detachment of the front portion from the middle portion, which may become necessary for cleaning purpose. For example, as illustrated in FIG. 3B, the front portion and middle portion are attached by a key connection (392-394). Although one type of connection is illustrated here, other alternative types of connections can also be used. In this type of removable attachment, a sealing ring is sometime incorporated between the contacting surfaces of the front portion and middle portion of the cap body in order to provide a liquid seal.

Referring again to FIG. 3A, in some embodiments, the middle portion (338) of the cap body can be placed between the front and a back portion (344) of the cap body. In some embodiments, the middle portion (338) can be a substantially solid piece with an upper curved surface (346) and a lower curved surface (348). In some embodiments, the middle portion (338) of the cap body can have a front surface (336) for attaching the back surface (not shown) of the front portion (316). In some embodiments, the middle portion (338) of the cap body can include a front concaved surface (350) substantially matching the curved surface of the liquid delivery roller (326). In some embodiments, the middle portion (338) can include a back angled surfaces (not shown) extending into the back portion (344) of the cap body. In some embodiments, the middle portion (338) of the cap body can include a first through lumen (354) for incorporating liquid control mechanism (302). In some embodiment, the middle portion (338) of the cap body can include a second through lumen (356) as the liquid communication channel. Although designated as separated portions, in some embodiments, the back portion (344) and middle portion (338) can be manufactured as one single piece. In some embodiments, the back portion and the middle portion are preferable manufactured as at least two pieces. In certain embodiments, the first end opening (358) for the first through lumen, also known as the liquid control mechanism lumen (354) can be located on the upper curved surface (346). In certain embodiments, the first end opening for the second through lumen, also known as the liquid communication lumen (356) can be located on the front concaved surface (350). In some embodiments, the second end opening (not shown) for both the first and second through lumen (354 and 356) can be located on the back angled surface (not shown).

Figure 8A:
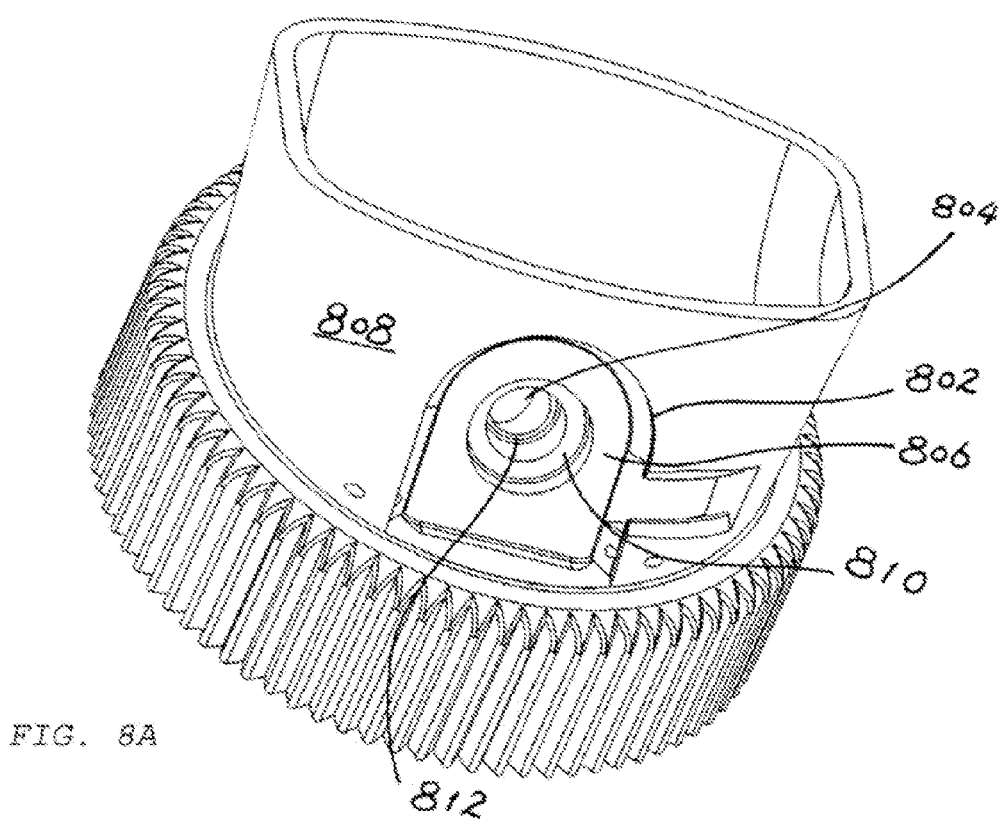
FIG. 8A is a top view of part of an exemplary embodiment of the present teachings and FIG. 8B is a bottom view of part of an exemplary embodiment of the present teachings.

Continuously referring to FIG. 8A, the liquid control cap can include a first end opening (802) for the first through lumen (804), where the first through lumen (804) can include a first indented surface (806) recessed from the upper curved surface (808), a second indented surface (810) recessed from the first indented surface (806), and a third indented surface (812) recessed from the second indented surface (810). The size and shape of each indented surfaces and the recess distances from the upper curved surface (808) to the first indented surface (806), the first indented surface (806) to the second indented surface (810), and the second indented surface (810) to the third indented surface (812) are designed to fit the corresponding parts of the liquid control mechanism as described herein.

Figure 8B:
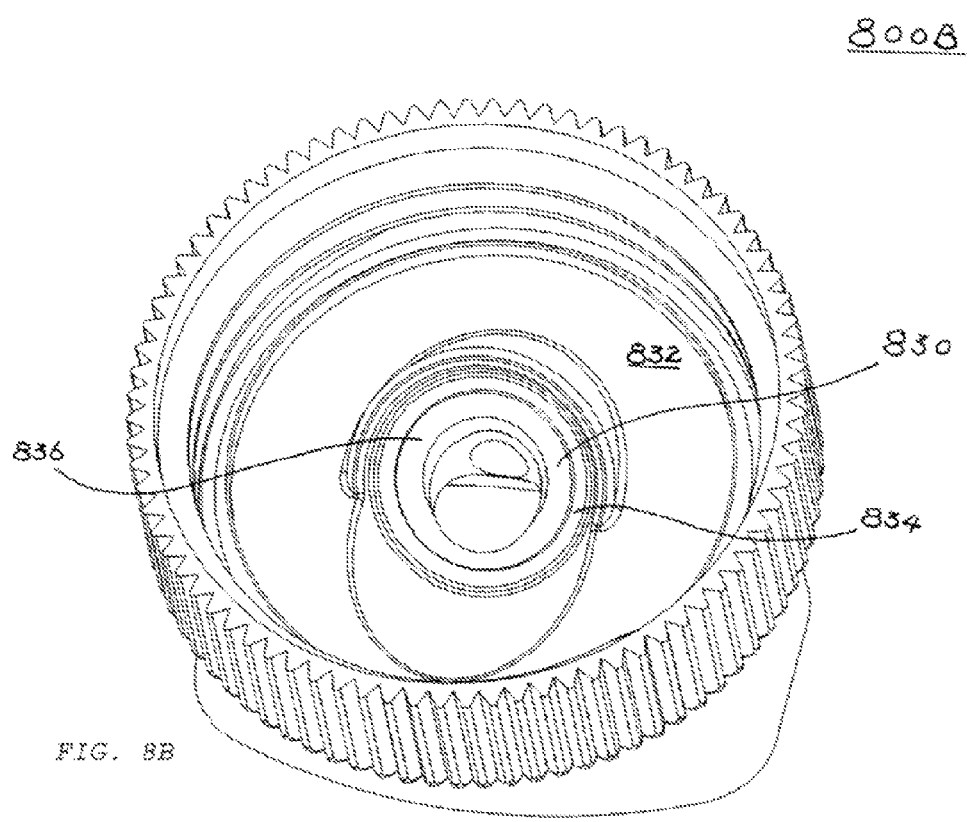

Continuously referring to FIG. 3A, the first end opening (352) for the second through lumen (356) can flash with the front concaved surface (350). As shown in FIG. 8B, the second end opening (830) on a back angled surface (832) can have a substantially lofted shape profile (e.g., a substantially lofted shape profile) to match the corresponding shape of a liquid control valve of on the liquid control mechanism as described herein. In some embodiments, a circular indent (834) can be situated on the lofted shape surface (836) of a second end opening (830). In certain embodiments, the circular indent (834) can be designed for the liquid sealing to be positioned within. In certain embodiments, the size and shape of the lofted shaped surface (836) of the second end opening (830) can be designed to fit the size and shape of the liquid control valve of the liquid control mechanism. In certain embodiments, the size and location of the circular indent is designed to match the size and corresponding location of the liquid seal.

Continuously referring to FIG. 2, in various embodiments, as illustrated in the figures, the cap body (204) can include a front portion (224), a middle portion (226) and the back portion (210). In some embodiments, the front portion can include an upper curved surface (214) and a lower curved surface (216), where the upper curved surface (214) can have more surface area than the lower curved surface (216). It should be understood that the purpose of such distribution can include accommodation to the size and profile of a push button (218) of a liquid control mechanism (206) and/or providing appropriate angle of the exposed roller to the animal. In some embodiments, the upper curved surface (214) can have the same surface area as the lower curved surface (216). In addition, as illustrated in the figures, the overall combining surfaces of the upper curved surface (214) and lower curved surface (216) can transform from a circular cross section profile (220), into a parameter into an elliptical cross section profile (222). In certain embodiment, such design can accommodate a cylindrical back portion (210) of the cap body and an ellipsoidal shape liquid delivery roller (202) held by the front portion (224) and middle portion (226) of the cap body.

Referring to FIG. 3A, the liquid delivery roller (326) can include an ellipsoidal shape component. In some embodiments, the liquid delivery roller (326) can have a hollow feature. In some embodiments, the liquid delivery roller (326) can have a solid feature. As illustrated in FIG. 3A, the outer surface of the liquid delivery roller (326) can be textured. In some embodiments, at least part of the surface of the liquid delivery roller (326) can have one or a plurality of small dents (360). In some embodiments, the liquid delivery roller (326) can include a porous surface. For example, the textures on the liquid delivery roller can further improve liquid transfer through increased surface area and friction between the roller and an external body, including an animal tongue. In certain embodiments, upon rolling of the liquid delivery roller (326), such as by an animal tongue, the liquid delivery roller (326) can spin around its first axis of symmetry (328) and carry the liquid from the liquid communication channel.

In some embodiments, the liquid control cap can include a front portion (316), a middle portion (338), and a back portion (344). In certain embodiments, the front portion (316) can be manufactured separately with the back and middle portion (338 and 344) of the cap body by processes described herein, including injection molding or others known by those skilled in the art. In some embodiments, the liquid delivery roller (326) can then be situated with part of the liquid delivery roller (326) positioned within the middle portion (338), and the other part of the liquid delivery roller (326) extending outside of the middle portion (338) of the cap body. In some embodiments, the back surface of the front portion (316) can then be attached to front surface (336) of the middle portion (338), for example, to form a one-piece cap body.

Now referring to FIG. 4, the liquid control cap can include a liquid control mechanism (412). In some embodiments, the liquid control mechanism (412) can include a push button (434), a control latch, a spring (418, including coil spring, compression torsion tape, torsion bar, and the like), a spring-compressing clip (416), a liquid control valve (420), a liquid seal (422) and a linking shaft (424) between the push button (434) and the liquid control valve (420). As illustrated in FIG. 4, in certain embodiments, the push button (434), the linking shaft (424) and the liquid control valve (420) can be fixedly connected to each other. In certain embodiments, the linking shaft (424) and the liquid control valve (420) can be manufactured as a one-piece part. In certain embodiment, upon assembling the linking shaft (424) and the liquid control valve (420) with other parts of the liquid control mechanism (412) and with the cap body, the push button can then be attached to the linking shaft (424). In various embodiments, the attachment process can be achieved by any processes known by those skilled in the art, such as ultrasonic welding, and others. It should be understood that steps of assembly described herein is only one choice for the present teachings, other processes can also be incorporated as long as the design intention can be satisfied.

Referring again to FIG. 4, in various embodiments, the spring (418) can slidably be disposed over the top portion of the linking shaft (424). In some embodiments, one end (426) of the spring (418) can be attached to the bottom surface of the push button (434). In some embodiments, the one end (426) can be adjacent to the bottom surface of the push bottom (414). In some embodiments, the other end (428) of the spring can remain unattached. In some embodiments, the spring compressing clip (416) can be attached to the spring (418). In some embodiments, compression of the spring compressing clip (416) towards the first indented surface (430) can open the liquid control valve (420). In some embodiments, relaxation of the spring (418) within the third indented surface (432) of the first opening of the cap body can push pushing button (434) upward and keep the liquid control valve (420) closed. In certain embodiments, the location of the liquid compressing clip (416) can be designed to control the amount of stroke of valve opening.

Referring again to FIG. 3A, in various embodiments, the liquid control valve (312) can have a general lofted shape with a sloped surface (362) and a bottom surface (not shown). In some embodiments, the liquid seal (314) can be attached to the circular indent of the cap body. In some embodiments, the liquid seal (314) can be attached to the sloped surface (362) of the liquid control valve (312), for example, through a circular indent (364). In yet other embodiments, the liquid seal (314) can remain a separate component from both liquid control valve (312) and the cap body. In the embodiments where the liquid seal (314) is attached liquid control valve (312) or the cap body, the attachment location can be in configurations different from what is illustrated in the figures. In some embodiments, the liquid seal (314) can be made of rubber, silicon, or other elastic materials.

Referring again to FIG. 6, in various embodiments, the liquid control mechanism can include a control latch (608). In some embodiments, the control latch (608) can slide toward the push button (610) and secure the push button (610), where the liquid control valve can be in a closed position. In some embodiments, the control latch (608) can slide away from the push button (610) and allow the push button (610) at a position that can open the liquid control valve. In other embodiments, the control latch (608) can also slide away from the push button (610) so that the push button (610) can be prevented from pushing downward; and the control latch (608) can slide toward the push button (610) so that the push button (610) can be released from its locked stage.

Figure 10A:
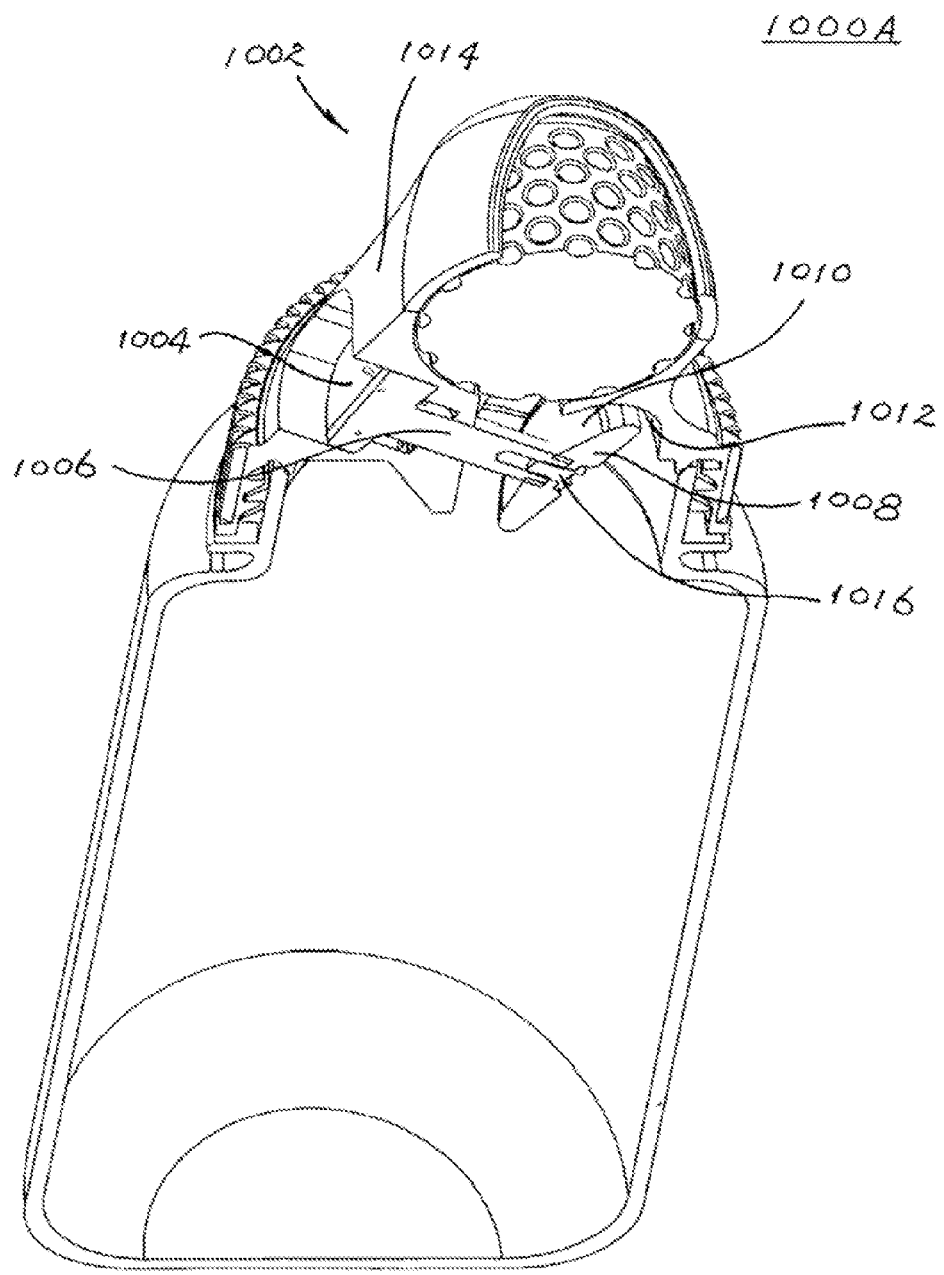
FIGS. 10A and 10B show perspective partially cut-away views of some exemplary embodiments of the present teachings.
Figure 10B:
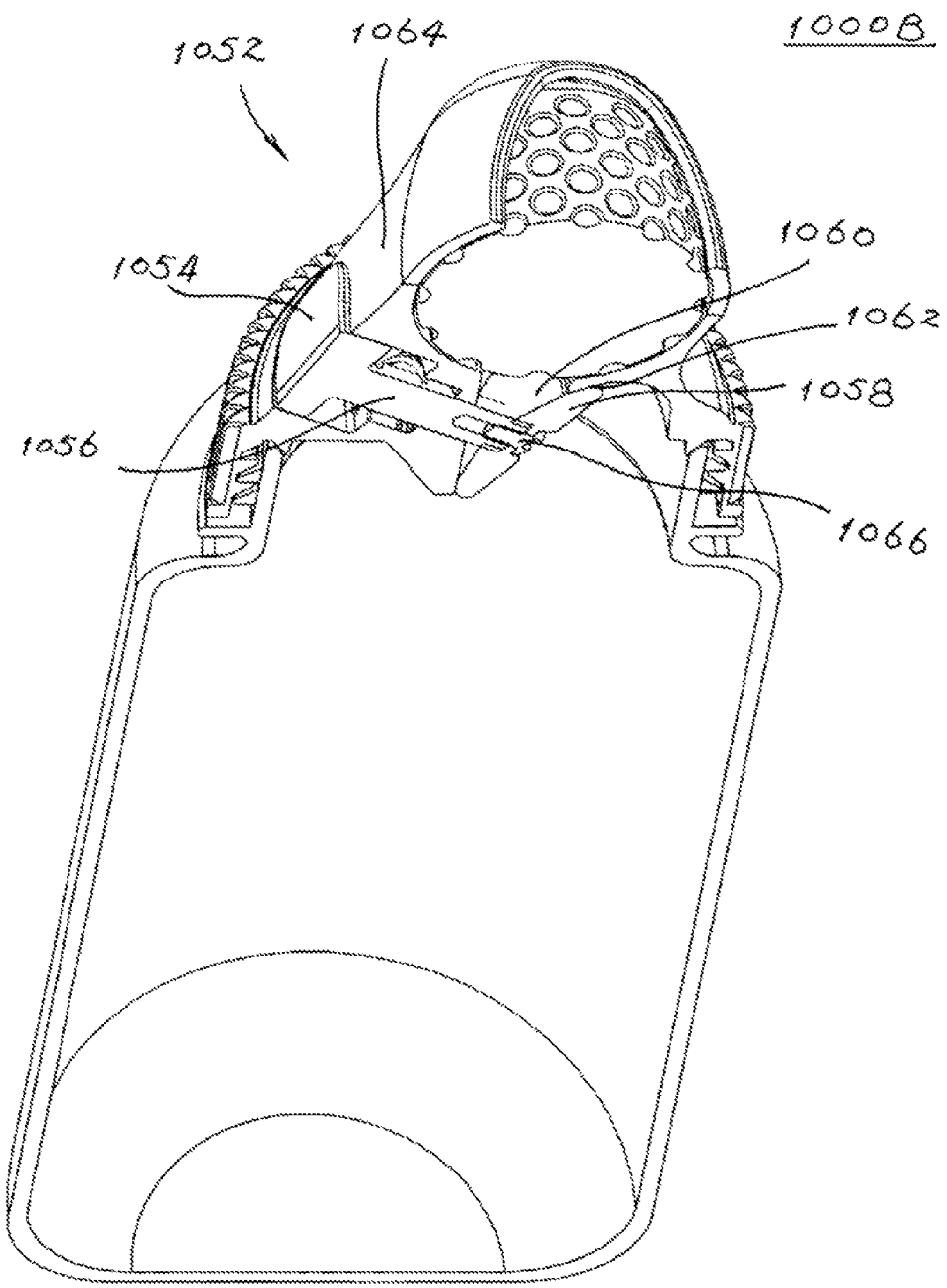

Other types of liquid control mechanism can also be used to control the liquid flow. FIG. 3B illustrates an alternative embodiment (300B) of the liquid control mechanism. It includes a push button (382), a linking shaft (384), a spring (386) slidably disposed over the linking shaft (384), a liquid control valve (388), and a connector (390) connecting the liquid control valve (388) to the linking shaft (384). In this embodiment, the push button (382) and the linking shaft (384) can be of one piece. In this embodiment 1000A (open position), and 1000B (closed position)), when the spring (386) in a relax state, the liquid control valve (388) is in a closed position, as illustrated in FIG. 10B. As push button (382) being pressed, the spring (386) is compressed, and the liquid control valve (388) opens, as illustrated in FIG. 10A.

Figure 9A:
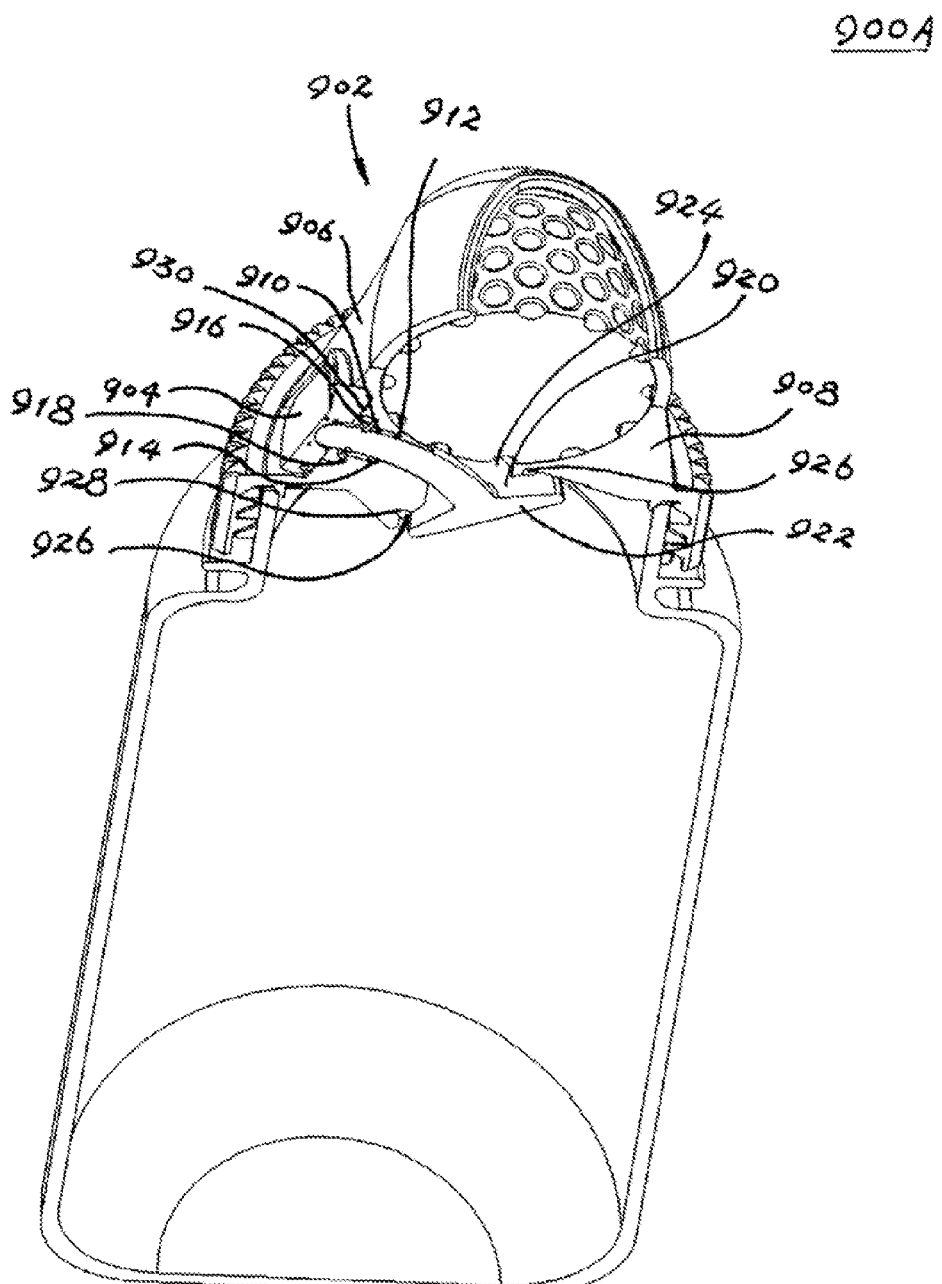
FIGS. 9A and 9B show perspective partially cut-away views of some exemplary embodiments of the present teachings.

FIG. 9A shows a final assembly (900A) of the cap body (902) with the liquid control mechanism where the liquid control mechanism is in its open stage. In some embodiments, as shown in FIG. 9A, the liquid control mechanism can include a control latch, where the control latch can slide away from the push button (904), thereby allowing the push button (904) being pushed downward. As shown in FIG. 9A, an external force $f_p$ can be used to push the push button radially inward with its bottom surface contacting a first indented surface (930) of a middle portion (908) of the cap body (902). As shown in FIG. 9A, in some embodiments, the portion of a spring (910) can be in its compressed stage. In some embodiments, a spring-compressing clip (916) can contact a second indented surface (918) of the middle portion (908) of the cap body (902). In certain embodiments, one end of the spring (912) can contact a third indented surface (914) of the middle portion (908) of the cap body (902), as such, the portion of the spring (910) between the button (904) or the spring-compressing clip (916) and the end (not shown) can be compressed to fit into the space between the second and third indented surfaces (918 and 914) of the middle portion (908) of the cap body (902). Subsequently, a sloped surface (920) of a liquid control valve (922) can move away from the lofted shape surface of a second end opening (924) of the middle portion (908) of the cap body (902) and therefore release a seal between a liquid seal (926) and a circular indent (928). As a result, the liquid communication channel can be opened.

Figure 9B:
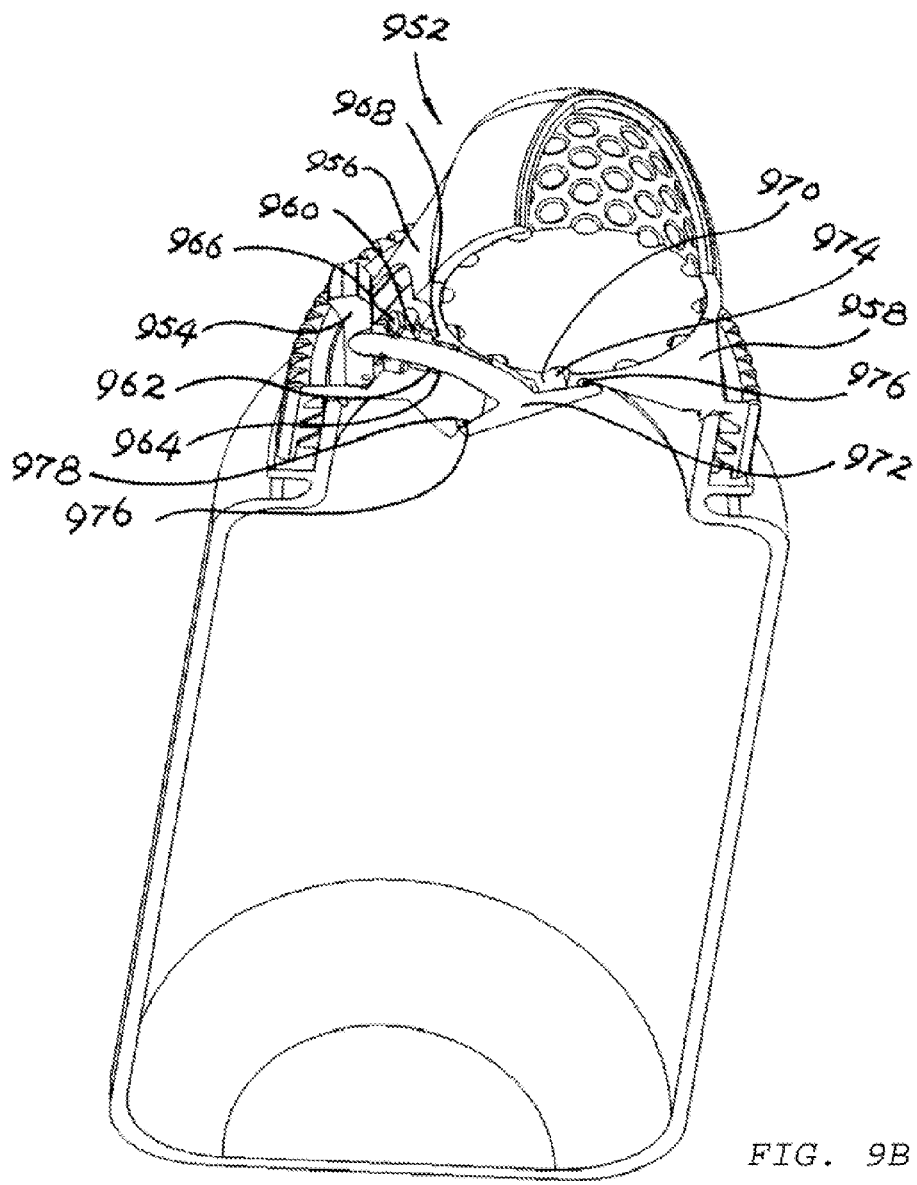

FIG. 9B shows a final assembly (900B) of the cap body (952) with the liquid control mechanism in its open stage. In some embodiments, as shown in FIG. 9B, the liquid control mechanism can include a control latch, where the control latch can be pushed toward a push button (954) and prevent the push button (954) from being pushed downward. In some embodiments, the push button (954) can extend radially outward from an upper curved surface (956) of the middle portion (958) of the cap body (952). In certain embodiments, the spring (960) can be relaxed with one end attaching the bottom surface of the push button (954). In certain embodiments, the other end (962) can remain free. In certain embodiments, the other end (962) can contact a third indented surface (964) of the middle portion (958) of the cap body (952). In the embodiments where the push button (954) extends radially outward from the upper curved surface (956) of the middle portion (958) of the cap body (952), a spring-compressing clip (966) can be extended away from a second indented surface (968) of the middle portion (958) of the cap body (952). Consequently, a sloped surface (970) of a liquid control valve (972) can come in contact with the lofted shaped surface of a second end opening (974) of the middle portion (958) of the cap body (952) and a liquid seal (976) can be compressed within a circular indent (978). As a result, the liquid communication channel can be closed.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is as follows:

1. A liquid delivery device comprising:
   a cap body having a front portion, a back portion, and a lumen extending from the front portion to the back portion, wherein the back portion of the cap is configured to attach to a liquid container having a longitudinal axis, the front portion of the cap body comprises a chamber comprising a front opening positioned in a plane that is angled with respect to a lower surface of said cap body, and the lumen is configured to allow liquid communication from the liquid container to the cap body,
   a liquid delivery roller, wherein the liquid delivery roller is at least partially housed in the chamber of the front portion of the cap body with a portion of the liquid delivery roller exposed through the front opening of the front portion of the cap body, and wherein the liquid delivery roller rolls freely within the cap body along an axis substantially perpendicular to the longitudinal axis, wherein said roller is not constrained on a fixed axis, and
   a push button liquid control mechanism attaching to the cap body and controlling the amount of liquid communication through the lumen of the cap body independent of the movement of the liquid delivery roller, wherein the liquid control mechanism further comprises a control end and a liquid control valve, wherein the control end controls the movement of the liquid control valve from a stop position, where the liquid control valve at least partially blocks the liquid communication through the lumen of the cap body, to a flow position, where the liquid control valve opens the lumen of the cap body to allow liquid communication between the liquid container and the cap body.

2. The liquid delivery device of claim 1 comprising a liquid container, wherein the cap body is detachably connected to the liquid container.

3. The liquid delivery device of claim 1 comprising a liquid container, wherein the cap body is non-detachably connected to the liquid container.

4. The liquid delivery device of claim 1, wherein the front portion of the cap body comprises an upper curved surface and a lower curved surface, wherein the front opening is between the first and second curved surfaces.

5. The liquid delivery device of claim 4, wherein the upper curved surface of the front portion of the cap body has more surface area than the lower curved surface of the front portion of the cap body.

6. The liquid delivery device of claim 4, wherein the upper curved surface of the front portion of the cap body has the same surface area as the lower curved surface of the front portion of the cap body.

7. The liquid delivery device of claim 1, wherein the front opening of the cap body has a substantially elliptical shape.

8. The liquid delivery device of claim 1, wherein the liquid delivery roller is substantially ellipsoidal.

9. The liquid delivery device of claim 1, wherein the liquid delivery roller is substantially cylindrical.

10. The liquid delivery device of claim 1, wherein the liquid delivery roller comprises a plurality of indents.

11. The liquid delivery device of claim 1, wherein the liquid delivery roller comprises a porous surface.

12. The liquid delivery device of claim 1, wherein the cap body comprises a middle portion.

13. The liquid delivery device of claim 12, wherein the liquid control mechanism is attached to the middle portion of the cap body.

14. The liquid delivery device of claim 12, wherein the front portion of the cap body is removably attached to the middle portion of the cap body.

15. The liquid delivery device of claim 12, wherein the middle portion of the cap body comprises an upper curved surface and a lower curved surface.

16. The liquid delivery device of claim 15, wherein the liquid control mechanism is attached to the upper curved surface of the middle portion of the cap body.

17. The liquid delivery device of claim 1 wherein the liquid control mechanism comprises a locking member, wherein the locking member is configured to lock the movement of the liquid control valve.

18. A method of delivering a liquid from a liquid container comprising:
   providing a liquid container,
   attaching a liquid delivery device to the liquid container, wherein the liquid delivery device comprising a cap body having a front portion, a back portion, and a lumen extending from the front portion to the back portion, wherein the back portion of the cap is configured to attach to the liquid container having a longitudinal axis, the front portion of the cap body comprises a chamber comprising a front opening positioned in a plane that is angled with respect to a lower surface of said cap body, and the lumen is configured to allow liquid communication from the liquid container to the cap body,
   a liquid delivery roller, wherein the liquid delivery roller is at least partially housed in the chamber of the front portion of the cap body with a portion of the liquid delivery roller exposed through the front opening of the front portion of the cap body, and wherein the liquid delivery roller rolls freely within the cap body along an axis substantially perpendicular to the longitudinal axis, wherein said roller is not constrained on a fixed axis, and
   a push button liquid control mechanism attaching to the cap body and controlling the amount of liquid communication through the lumen of the cap body independent of the movement of the liquid delivery roller,
   wherein the liquid control mechanism further comprises a control end and a liquid control valve, wherein the control end controls the movement of the liquid control valve from a stop position, where the liquid control valve at least partially blocks the liquid communication through the lumen of the cap body;
   setting the liquid control valve to the flow position; and
   allowing liquid communication within the lumen of the cap body.

* * * * *